United States Patent Office 3,281,345
Patented Oct. 25, 1966

3,281,345
PROCESS FOR MANUFACTURING GRAFT COPOLYMERS FROM POLYMERS BASED UPON VINYL CHLORIDE AND ELASTOMERS
Gerhard Kühne, Burghausen, Upper Bavaria, Germany, assignor to Farbwerke Hoechst Aktiengesellschaft vormals Meister Lucius & Brüning, Frankfurt am Main, Germany, a corporation of Germany
No Drawing. Filed Feb. 26, 1963, Ser. No. 261,234
Claims priority, application Germany, Feb. 28, 1962, F 36,142
10 Claims. (Cl. 204—163)

The present invention relates to a process for the manufacture of graft copolymers.

It is known to improve the impact strength of extruded or calendered objects of polyvinyl chloride by incorporating with the polyvinyl chloride a component imparting elasticity, for example natural or synthetic rubber, copolymers of butadiene with styrene, acrylonitrile or maleic acid esters, or rubber-like polymers of acrylic acid esters. It has also been proposed to admix such rubber-like polymers in the form of a latex with monomeric vinyl chloride or mixtures of monomeric vinyl chloride with other monomers already before the polymerization and to polymerize the resulting mixture by suspension polymerization. In this case, a large number of side-reactions occur and an, in part, undesirable grafting of vinyl chloride on to the unsaturated rubber-like polymer present in the mixture takes place so that, on the one hand, the times of reaction are considerably prolonged and, on the other hand, the processing of the polymer on a calender or extruder is impeded and, finally, the thermal stability of the polymer is reduced. Since the fluidity of such modified polyvinyl chlorides is inferior to that of pure polyvinyl chloride, these modified polymers are unsuitable, for example, as raw material for the deep-drawing of sheets or films.

The present invention provides a process for incorporating a component imparting elasticity with a polymer based on vinyl chloride, i.e., consisting substantially of vinyl chloride units, which process enables the above mentioned disadvantages to be overcome. The polymers obtained by the process of the invention can be worked up, for example, into films or sheets which are distinguished by an improved toughness and good deep-drawing properties.

According to the process of the invention, vinyl chloride or mixtures thereof with other copolymerizable monovinyl compounds are polymerized in an aqueous emulsion to an extent of conversion of at least 60%, advantageously 70 to 85%, in known manner in the presence of usual additives, e.g., emulsifiers and catalysts such as, for example, peroxides, for example by the process described in the publication "Vinyl and Related Polymers," by C. A. Schildknecht, edited by John Wiley & Sons, Inc., New York, 1952, page 395, et seq., or in the publication, "Polyvinylchlorid und Vinylchlorid-Mischpolymerisate," by F. Kainer, edited by Springer Verlag, 1951, page 41, et seq. When the aforesaid extent of conversion has been reached, an elastomeric latex based on butadiene, isoprene or higher conjugated dienes is admixed and the total mixture so obtained is polymerized to a higher extent of conversion, generally to an extent of conversion of 90 to 95% of the total of the monomers used as a starting material.

The elastomer latex added in the second stage of the process may be a homopolymer or copolymer of dienes, for example butadiene or isoprene, or a copolymer with larger or smaller amounts of monomeric vinyl compounds such as acrylonitrile, styrene, vinyl chloride, vinylidene chloride, maleic acid esters, esters of acrylic acid or methacrylic acid or other compounds containing the grouping $CH_2=C<$.

In a preferred form of the process of the invention, i.e., when mixtures of several monomers are used, mixtures of vinyl chloride with 1 to 20% of other copolymerizable monomeric vinyl compounds are used in the first stage of the process. When in the second stage copolymers are used as the elastomer latex there are advantageously used those having a diene content of at least 75% by weight. With this method of working, the residual monomeric vinyl chloride is partially grafted on to the elastomer added after the first stage. The grafting reaction may additionally be accelerated by peroxides or radiation with ultraviolet light or hard rays, for example X-rays or γ-rays. Care should be taken, however, that not all double bonds of the elastomer are saturated.

The proportion of elastomer contained in the product obtained by the process of the invention may amount to 0.5 to 10%, advantageously 1.5 to 5%, calculated on the weight of the total copolymer. The process of the invention is advantageously carried out in two separate polymerization aggregates. In the first aggregate the vinyl monomers are polymerized to an extent of conversion of 60 to 85% and in the second aggregate the reaction product of the first aggregate is further polymerized to an extent of conversion of 95%, while continuously introducing the elastomer latex.

The amount of elastomer latex added in the second stage is such that the proportion of elastomer contained in the final copolymer amounts to 0.5 to 10% by weight, advantageously 1.5 to 5% by weight.

The process of the invention yields homogeneous latices of graft copolymers which are entirely free from fish eyes, are mechanically stable and have no tendency to deposit. The latices obtained by the process of the invention can be worked up by spray drying or drum drying.

The elastomers used in the process of the invention may be partially cross-linked and completely insoluble in organic solvents such as hydrocarbons, chlorinated hydrocarbons, aromatic solvents, cyclohexanone or dimethylformamide. The copolymers obtained by the process of the invention yield shaped articles which are distinguished by an excellent resistance to ageing and are far superior to similar articles made of a mixture of polyvinyl chloride with rubber polymers soluble in organic solvents.

It is surprising that a considerably lower proportion of elastomer in the total copolymer is necessary than in the case of a polymer to be used as rubber. A proportion of elastomer of 2.5% by weight already produces a pronounced effect. With an elastomer proportion of 10%, the toughness of a film or sheet made from the copolymer is 8 times that of a comparison film or sheet of polyvinyl chloride containing 10% by weight of a commercial rubber addition.

To simultaneously obtain favorable deep-drawing properties, low proportions of elastomer are advantageously used. In the case of the above mentioned special elastomers, a proportion of 1.5 to 5% by weight of elastomer is sufficient. Suitable elastomers for the process of the invention are, for example, copolymers of butadiene, isoprene, higher conjugated dienes or halogen-substituted dienes such as 2-chlorobutadiene-1.3 with acrylonitrile, styrene, maleic acid esters, esters of acrylic or methacrylic acid or other monomers containing the grouping $CH_2=C<$. Most suitable are elastomers based on butadiene and acrylonitrile. The weight ratio of butadiene to acrylonitrile may be within the range of 75:25 to 95:5. Products of an especially favorable processibility are obtained by using an elastomer of butadiene and acrylonitrile in a weight ratio of 90:10. The copolymerization of butadiene with acrylonitrile is carred out at a temperature wthin the range of 40 to 80° C. until a high extent of conversion is obtained. The manufacture of this and other elastomers suitable for the process of the invention has been described, for example in "Rubber Age," vol. 54, 1943, pages 299 and 336, and in British Patent 360,821 and does not form a part of the present invention which relates only to the combination of such elastomers with polyvinyl chloride.

To illustrate the technical effect of the process of the invention, the toughness of a rigid sheet of a graft copolymer of the invention was compared with that of a rigid sheet of a product obtained by merely mixing a separately reacted latex of polyvinyl chloride with a corresponding elastomer. The impact tensile tests were performed according to the Racké method (cf. "Materialprüfung" (edited by VDI und Stahleisen, Düsseldorf) 3/3, 1961, 89, filed as a DIN (German Industrial Standards) Specification Draft). The indicated values are mean values from 10 individual measurements.

| Polymer raw material emulsion polyvinyl chloride with— | Thickness of sheet, $\mu$ | Impact tensile strength, kg.cm./cm.$^2$ | | | Notched impact tensile strength, kg.cm./cm.$^2$ | | |
|---|---|---|---|---|---|---|---|
| | | Longitudinal | Transverse | Average | Longiverse | Transage | Average |
| 2.5% by weight of elastomer [1] grafted | 400 | 557 | 592 | 574 | 128 | 131 | 130 |
| 2.5% by weight mixed | 400 | 510 | 504 | 507 | 126 | 119 | 123 |
| 5.0% by weight of elastomer [1] grafted | 400 | 635 | 674 | 655 | 140 | 142 | 144 |
| 5.0% by weight mixed | 400 | 645 | 609 | 627 | 134 | 133 | 134 |
| 7.0% by weight of elastomer [1] grafted | 400 | 638 | 638 | 638 | 157 | 140 | 149 |
| Without foreign substance | 400 | 439 | 468 | 454 | 103 | 106 | 105 |

[1] According to Example A.

It is evident from the foregoing table that the products obtained by the process of the invention which contain 2.5% or 5% of grafted elastomer have an impact strength which is, on an average, 25% and 40%, respectively, higher than that of a normal polyvinyl chloride sheet and that with a low portion of elastomer, i.e., below 5%, the grafting process of the invention leads to an increase in toughness of 43%.

With a low proportion of grafted elastomer in the copolymer, the films or sheets made from the copolymer have an excellent resistance to ageing and to extraction by food and other goods.

The following examples serve to illustrate the invention but they are not intended to limit it thereto. For the examples, an elastomer latex was first prepared by proceeding as described in Example A.

*Example A*

Into a pressure vessel provided with a stirrer there were introduced 150 liters of an aqueous polymerization medium containing 2.0 kilograms of a commercial emulsifier, for example an alkylaryl sulfonate, and 120 grams of secondary sodium phosphate. Then 320 grams of potassium persulfate were added, the reaction vessel was scavenged with nitrogen and evacuated. 8.0 kilograms of acrylonitrile and 72 kilograms of butadiene were introduced under pressure, the whole was heated to 50° C. and polymerized, while stirring, until the pressure had dropped to 2.5 atmospheres gage. After about 30 to 35 hours, the reaction was terminated, the extent of conversion amounting to about 90%. A finely divided latex of 32% strength was obtained which was stable towards shearing stress and from which a solid rubber-like polymer could be isolated by evaporation, which rubber-like polymer was insoluble in hydrocarbons, chlorinated hydrocarbons, aromatic solvents, cyclohexanone and dimethylformamide.

*Example 1*

(a) 220 liters of an aqueous polymerization medium containing 5.2 kilograms of sodium alkyl sulfonate (alkyl: $C_{12}$) and which had been buffered with 180 grams of secondary sodium phosphate and adjusted to a pH value of 9.5 with sodium hydroxide solution, were introduced into a pressure vessel provided with a stirrer. 360 grams of potassium persulfate were added, the reaction vessel was scavenged with nitrogen and evacuated. 180 kilograms of vinyl chloride were then run in, the mixture was heated to 55° C., while stirring gently, and polymerized until the pressure had dropped to 7.7 atmospheres gage.

At the extent of conversion thus obtained which amounted to about 80% of the monomer, 25.2 liters of an elastomer latex of about 32% strength which had been previously prepared in one case as described in Example A and in another case as described in Example 5, were added and the polymerization was continued until the pressure was 3.5 atmospheres gage.

A homogeneous latex of the graft copolymer was obtained which was worked up by spray drying in one instance, and by drum drying in another instance.

The shaped articles made from the isolated copolymer powder were distinguished by their good tough-resilient properties.

(b) In a narrow vessel provided with a stirrer, vinyl chloride was continuously emulsion-polymerized in known manner until an extent of conversion of 85% had been obtained. At the lower end of the vessel a latex of 41% strength was continuously transferred under inherent pressure into a second vessel provided with a stirrer which was kept at a temperature by 5 to 10° C. lower than the temperature in the first vessel.

Into this second container, an elastomer latex which had been previously prepared in one case as described in Example A and in another case as described in Example 5, was continuously introduced with the help of a pump through a second feed pipe and the conversion of the vinyl chloride was continued to an extent of about 95% in the presence of the foreign latex. The amount of foreign latex introduced per hour was such that the proportion of elastomer in the total copolymer amounted to 5.0% by weight.

Owing to the weak dilution with foreign latex, the graft latex which was removed continuously had a concentration of only 45.2% by weight (without the addition of foreign latex a concentration of 45.8% would have been obtained with an extent of conversion of 95%).

The graft latex obtained by the process of the invention had an interfacial tension of 34 dynes/cm. It could therefore be conveyed with all pump systems and worked up according to known methods. The tough-resilient properties of the graft latex were of the same order of magnitude as those of the product obtained as described in Example 1a.

Example 2

As the elastomer latex, a finely divided latex of 33% strength was used which had been obtained from 20 kilograms of acrylonitrile and 60 kilograms of butadiene by polymerizing at 70° C. until the pressure had dropped to 3.0 atmospheres gage, the other conditions being as described in Example A. In the manner described in Example 1b the latex was continuously added with the help of a pump to the polyvinyl chloride latex in the second polymerization vessel, which was continuously polymerized until an extent of conversion of 95% had been obtained. The graft latex which formed was drawn off continuously.

The powder obtained from the graft latex as described above could be worked up into tough-resilient shaped articles.

Example 3

In the manner described in Example 1a, 37.8 liters of an elastomer latex of 32% strength obtained as described in Example A were added with the help of a pump to a discontinuously polymerizing polyvinyl chloride latex as soon as the latter had reached an extent of conversion of about 70%. The batch was then further polymerized until the pressure had dropped to 3.5 atmospheres gage.

The graft latex so obtained was worked up as described above. The impact strength of the shaped articles made from the powder of the graft latex was 1.6 times that of normal polyvinyl chloride.

Example 4

The process was carried out as described in Example 1b in a manner such that the final copolymer in the second polymerization vessel contained 1.5% by weight of elastomer. Contrary to Example 1b, however, the said polymerization vessel was additionally irradiated with an ultraviolet lamp emitting rays of a wave length within the range of 2,000 to 4,000 angstrom units. In this manner, the graft copolymerization of the still unreacted proportion of vinyl chloride with the unsaturated elastomer was accelerated and, moreover, additional valencies were set free form linking polyvinyl chloride molecules to the elastomer.

The graft copolymer so obtained was distinguished by a particularly good processibility and resistance to ageing and to extraction. The impact strength was in the order of magnitude of that of the product of Example 1b.

Example 5

150 liters of a polymerization medium containing 2.0 kilograms of an alkyl sulfate (alkyl: $C_{12}$) as an emulsifier and 120 grams of secondary sodium phosphate as a buffer and which had been adjusted to a pH value of 10.0 with sodium hydroxide solution, were introduced into the pressure vessel described in Example 1a. 600 grams of 30% hydrogen superoxide were added, the reaction vessel was scavenged with nitrogen and evacuated, 20 kilograms of styrene and 60 kilograms of isoprene were introduced into the vessel, the mixture was heated to 60° C. and the reaction was carried out within 40 hours until an extent of conversion of 90% had been obtained.

An elastomer latex of 31.7% strength free from fish eyes was obtained which was used as described in Examples 1a, 1b, 3 and 4 for carrying out the process of the invention.

Example 6

220 liters of an aqueous polymerization medium containing 5.0 kilograms of an alkylarylsulfonate and which had been buffered correspondingly and adjusted to a pH value of 9.0 were introduced into a vessel provided with a stirrer. 360 grams of potassium persulfate were added, the reaction vessel was scavenged with nitrogen and evacuated. 9.0 kilograms of vinyl acetate were added and 171 kilograms of vinyl chloride were introduced under pressure. The reaction mixture was heated to 50° C. and polymerized until the pressure had dropped to 6.5 atmospheres gage, which corresponded to an extent of conversion of the vinyl monomers of about 85%. 37.8 liters of the elastomer latex described in Example A were introduced with the help of a pump and the whole was polymerized until the pressure had dropped to 4.0 atmospheres.

The graft latex so obtained was worked up by drum drying. The powder so obtained could particularly well be worked up on an extruder and yielded shaped articles of excellent impact strength.

I claim:

1. A process for the manufacture of graft copolymers from thermoplastic and elastomeric polymers which comprises polymerizing in an aqueous emulsion a mixture of vinyl chloride and 1 to 20 percent by weight of at least one other compatible monomeric vinyl compound until 60 to 85% of the monomer is polymerized, then mixing the emulsion so obtained and containing unreacted vinyl chloride with a latex having as an essential ingredient an elastomeric polymer selected from the group consisting of a polymer of butadiene, isoprene, a higher conjugated diene and mixtures of said dienes and monomeric vinyl compounds wherein the portion of the diene is at least 75%, and polymerizing the mixture so obtained until 90 to 95% of the vinyl monomer is polymerized.

2. A process for the manufacture of graft copolymers from thermoplastic and elastomeric polymer and having a content of 0.5 to 10 percent by weight of said elastomeric polymer which comprises polymerizing in an aqueous emulsion a member selected from the group consisting of vinyl chloride and a mixture of vinyl chloride and at least one other compatible monomeric vinyl compound until 60 to 85% of the monomer is polymerized, then mixing the emulsion so obtained and containing unreacted vinyl chloride with a latex having as essential ingredient an elastomeric polymer selected from the group consisting of a polymer of butadiene, isoprene, a higher conjugated diene and mixtures of said dienes and monomeric vinyl compounds wherein the portion of the diene is at least 75%, and polymerizing the mixture so obtained until 90 to 95% of the vinyl monomer is polymerized, the elastomer latex being added in a quantity which corresponds to a content of 0.5 to 10 percent by weight of the elastomeric component in the graft copolymer obtained.

3. A process for the manufacture of graft copolymers from thermoplastic and elastomeric polymers, which comprises polymerizing in an aqueous emulsion a member selected from the group consisting of vinyl chloride and mixtures of vinyl chloride with at least one other compatible monomeric vinyl compound, until 60 to 85% of the monomer is polymerized, mixing the latex so obtained and containing unreacted vinyl chloride along with the polymer thoroughly with a second latex containing as sole essential ingredient an elastomeric polymer selected from the group consisting of the polymers of dienes and copolymers from dienes and monomeric vinyl compounds with at least 75% of diene component, and subjecting the mixture of the two latices to polymerizing conditions until 90 to 95% of the vinyl monomer present is graft polymerized onto the elastomeric diene polymer.

4. A process according to claim 3 wherein the elastomeric polymer is a copolymer of a diene and a monomeric vinyl compound selected from the group consisting of acrylonitrile, styrene, vinyl chloride, vinylidene chloride, an ester of maleic acid, an ester of acrylic acid and an ester of methacrylic acid and in which the content of the diene is at least 75 percent by weight, said elastomeric copolymer being insoluble in organic solvents of the group consisting of hydrocarbons, chlorinated hydrocarbons, aromatic solvents, cyclohexanone and dimethylformamide.

5. A process according to claim 3, wherein the elastomeric polymer is a copolymer of a diene and a monomeric vinyl compound selected from the group consisting of acrylonitrile, styrene, vinyl chloride, vinylidene chloride, an ester of maleic acid, an ester of acrylic acid and an ester of methacrylic acid and in which the content of the diene is at least 75 percent by weight.

6. A process according to claim 3, wherein the graft copolymerization is catalyzed by means of ultraviolet radiation.

7. A process according to claim 3, wherein the graft copolymerization is catalyzed by means of high energy ionizing radiation.

8. Aqueous emulsion comprising an admixture of graft copolymers obtained by polymerizing in an aqueous emulsion a member selected from the group consisting of vinyl chloride and a mixture of vinyl chloride and at least one other compatible monomeric vinyl compound until 60–85 percent of the monomer is polymerized, mixing the emulsion so obtained and containing unreacted vinyl chloride with a latex having as an essential ingredient an elastomeric polymer selected from the group consisting of a polymer of butadiene, isoprene, a higher conjugated diene and mixtures of said dienes and monomeric vinyl compounds, wherein the portion of the diene is at least 75 percent, and polymerizing the mixture so obtained until 90–95 percent of the vinyl monomer is graft polymerized onto the elastomeric diene polymer.

9. Aqueous emulsion comprising an admixture of graft copolymers according to claim 8 having a content of 0.5 to 10 percent by weight of an elastifying polymer obtained by polymerizing in an aqueous emulsion a member selected from the group consisting of vinyl chloride and a mixture of vinyl chloride and at least one other compatible monomeric vinyl compound until 60 to 85 percent of the monomer is polymerized, mixing the emulsion so obtained and containing unreacted vinyl chloride with a latex having as an essential ingredient an elastomeric polymer selected from the group consisting of a polymer of butadiene, isoprene, a higher conjugated diene and mixtures of said dienes and monomeric vinyl compounds wherein the portion of the diene is at least 75 percent, and polymerizing the mixture so obtained until 90 to 95 percent of the vinyl monomer is graft polymerized onto the elastomeric diene polymer the elastomeric latex being added in a quantity which corresponds to a content of 0.5 to 10 percent by weight of the elastomeric component in the graft copolymer obtained.

10. An aqueous emulsion comprising an admixture of graft copolymers according to claim 9 obtained by polymerizing vinyl chloride in an aqueous emulsion, mixing the emulsion containing the unreacted vinyl chloride so obtained with a latex having as its essential ingredient an elastomeric copolymer of a diene and a monomeric vinyl compound selected from the group consisting of acrylonitrile, styrene, vinyl chloride, vinylidene chloride, an ester of maleic acid, an ester of acrylic acid and an ester of methacrylic acid, said elastomeric copolymer being insoluble in organic solvents of the group consisting of hydrocarbons, chlorinated hydrocarbons, aromatic solvents, cyclohexanone and dimethyl formamide, and polymerizing the mixture so obtained.

References Cited by the Examiner

UNITED STATES PATENTS

| | | | |
|---|---|---|---|
| 2,996,469 | 8/1961 | Cole et al. | 260—879 |
| 3,097,180 | 7/1963 | Tausch | 260—891 |
| 3,167,598 | 1/1965 | Heaps et al. | 260—891 |

FOREIGN PATENTS 1,166,793   11/1958   France.

OTHER REFERENCES

Schildknecht: Vinyl and Related Polymers, Wiley & Sons, Inc., N.Y., 1952, p. 396.

MURRAY TILLMAN, *Primary Examiner.*

N. F. OBLON, *Assistant Examiner.*